Nov. 10, 1936.   T. P. FINEFROCK ET AL   2,060,295
ACOUSTICAL OR INSULATING PLASTER
Filed June 22, 1934
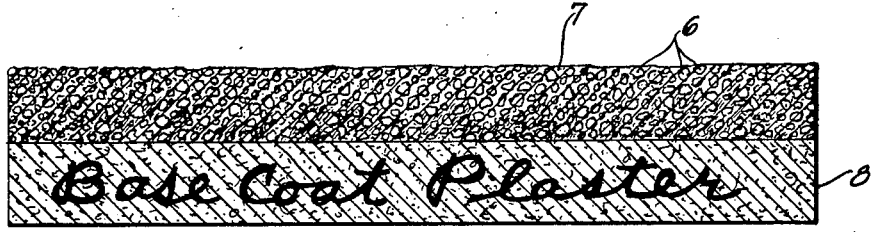
INVENTORS.
Thomas P. Finefrock
William F. O'Neil
BY John A. Bommhardt
ATTORNEY.

UNITED STATES PATENT OFFICE 2,060,295

ACOUSTICAL OR INSULATING PLASTER

Thomas P. Finefrock and William F. O'Neil, Port Clinton, Ohio, assignors to The American Gypsum Co., Port Clinton, Ohio, a corporation of Ohio Application June 22, 1934, Serial No. 731,910

9 Claims. (Cl. 106—18)

This invention relates to improvements in acoustical or insulating plaster, and methods of making same, for walls and ceilings. This plaster may be applied over ordinary gypsum brown coat or metal lath with the usual plasterers' tools.

Novel practices and methods as herein described will give an acoustical plaster possessing better working qualities, greater covering capacity, and a more porous and open texture than that found in any plaster that has yet been produced to our knowledge.

We do not depend upon the use of certain graded aggregates bonded together at their points of contact and possessing open interstices between the different aggregate particles, as a means of obtaining sound absorption. Neither do we depend upon some special manner of application which leaves the surface specially porous. We obtain high sound absorption through the use of a different type of absorbing medium and ingredients as will be herein described.

Our product is very light and fluffy. The major portion of its bulkiness is derived from the use of a specially processed mineral or rock wool; this processing enables us to use a much greater percentage by weight of the mineral or rock wool than has heretofore been possible.

The mineral or rock wool is in a form which we shall herein refer to as "fibrous pellets". These pellets cannot be classed as an aggregate as they do not possess the structure, hardness or strength which is characteristic of such an article. These fibrous pellets are made up of a mass of fine, pliant fibers between which there are multitudes of small openings or pores that provide excellent facilities for sound absorption. Though the efficiency of mineral wool as a sound absorbing medium has long been known, its use in plaster in any appreciable quantity has heretofore been restricted because of its detrimental effect upon the working qualities.

As supplied by manufacturers, mineral wool has the form of small tufts, or fibrous wads, the bulk of which ranges from ⅛ to ⅜ inches in diameter, and which, when added to plaster in excess of 25% of the completed formula, are sufficiently coarse to make the plaster incapable of being satisfactorily worked or decorated. In practicing our invention, we change these tufts, or fibrous wads, into such a condition that we are enabled to use a much greater percentage of them in a workable formula. We do this by placing a quantity of the wads in a mixer and subjecting them to a thorough agitation therein for predetermined periods of time. The friction and agitation produced in the mixer serves to reduce all of the pellets in size and at the same time to completely disintegrate a great portion of them into a host of small independent fibres almost microscopic in diameter and ranging from particle size to ⅜" inches in length. These fibres lend desirable working qualities to the formula. At the same time, the remaining wads have been so reduced in size as to permit a much greater proportion of them to be used without any consequent dangers of poor working qualities or difficulties in decorating because of a too rough finish. The degree or extent of this conditioning can be effectively controlled by varying the time the pellets are allowed to agitate in the mixer or by varying the speed of the agitating paddles in the mixer.

To this processed mass of compacted or disintegrated fibrous pellets we add other ingredients as will be later described, and after suitable mixing the composition is complete and ready for application after the addition of water. We have also found it possible to add the mineral wool as we receive it, together with all other ingredients used, into the mixer at the same time, rather than first subjecting the wads to a preconditioning as noted in the previous paragraph. However, when this procedure is followed additional mixing is required in order that the wads will be reduced to the proper size and condition.

To the pellets so conditioned or compacted we add from 40% to 50% by weight of plaster of Paris as a cementing agent; however, Portland cement, lime, Keene's cement or any other cementitious material may be substituted if so desired.

A novel feature of this composition is the use of blood flour as a source of albumin; this blood flour is mixed into and is an integral part of the composition as it fulfills certain features herein described. In this connection we call attention to U. S. Patent No. 1,787,162 granted to G. A. New, assignor to the American Gypsum Company of Port Clinton, Ohio. This patent relates to the unusual foaming qualities developed in a calcined gypsum mixture through the action of either burned or hydrated lime upon blood albumin when the two are mixed with calcined gypsum and water added.

In our present invention we could follow the same procedure as described in the above mentioned patent, but prefer to take advantage of the fact that the fibrous pellets composing a major portion of our composition carry approximately 1% of available lime, making it necessary for us to add only the albumin to secure the required foaming action. The fact that the available lime is an integral part of the fibrous pellets interspersed throughout the mixture insures a complete and uniform reaction between the albumin and lime.

As a source of albumin we have used dried blood flour because it is finely ground and relatively cheap, but we do not wish to restrict ourselves to blood albumin only as other albuminous substances will work equally well.

When water is first added and mixed into the plaster, the mix at first lacks much plasticity or richness. However, upon soaking for a few minutes, the water begins to leach out the available lime in the pellets which at once reacts with the albumin. The interaction at first appears to form a glue or colloid that greatly enhances the richness and plasticity of the mixture. Further mixing of the soaked plaster produces a light frothy cellular structure that is exceedingly stable. This cellular structure aside from being formed by the action of the lime and albumin, is assisted by the physical structure of the materials. Inasmuch as the dry composition is light and fluffy, it contains a large amount of air. Upon mixing, this air does not escape, but is entrapped and held in the wet mix by the gluey colloid previously referred to. The small resulting air cells do not readily break down and they are thoroughly interspersed throughout the mixed plaster. As far as working qualities are concerned these small stable air cells act like so much actual aggregate of the same size but when the plaster is applied to a gypsum base coat, the suction in the base coat removes most of the free moisture from the plaster and as a result the cells collapse, leaving in their stead a host of minute pores and hollow structures that greatly increase the porosity of the finished plaster coat.

Summing up the action between the lime and albumin as used in our formula we find it to be threefold; it improves the plasticity and workability during application; it acts as a frothing or foaming agent; and it serves to retain the air introduced into the formula by the multitudinous air cells or pores in the fibrous pellets.

To the mixture already described we may also add approximately 1% of wood flour to act as a carrying agent for air cells. Upon the addition of water to a mixture containing wood flour small air bubbles will form around the individual particles of wood flour and cling to them tenaciously. A clay or diatomaceous earth may be used for this purpose but we prefer wood flour because of its fluffier nature, and also because of the fact that its shrinkage upon drying helps to increase the porosity of the plaster.

Asbestos and expanded vermiculite mica are or may be added for fibering and weight reducing purposes. Gums or dextrines may be added to harden the surface, and the composition is properly retarded when plaster of Paris is used so that there will be ample working time upon the job.

The preferred formulae as manufactured will contain approximately:

| | Percent |
|---|---|
| Fibrous pellets (mineral or rock wool) | 40–60 |
| Plaster of Paris | 40–50 |
| Zonolite | 2– 3 |
| Asbestos | 5– 6 |
| Wood flour | 1– 2 |
| Albumin | .1– .2 |
| Commercial retarder | .2– .3 |

To assist in understanding the nature and results of the invention, Fig. 1 of the accompanying drawing is a cross section of the resulting plaster, enlarged, and Fig. 2 is a view of one of the pellets, enlarged, in the approximate form to which it is reduced or conditioned in a mixer, prior to or when incorporated in the composition.

The pellets are indicated at 6, and the remainder of the composition at 7, and the former have the appearance of small masses or bodies of the fibrous material, which are so small that they are readily incorporated or worked into a comparatively free flowing mixture, free from the difficulties heretofore found with the use of elongated tufts of mineral wool or the like. The base coat plaster is indicated at 8.

The completed composition produces a material with improved working qualities in which the sound absorbing values are effectively controlled through the use of fine fibers and small or graded pellets.

The composition can be cast into board or tile, which may be applied with cement, furring strips, metal clip attachments, etc.

Upon the addition of water and thorough mixing, the plaster is ready for application. It is applied and leveled up with a common steel trowel. Upon application to an ordinary gypsum brown coat—(preferably dry) the suction removes most of the excess water from the acoustical plaster and breaks up the colloidal cellular structure. This leaves a very open and porous surface that is not at all compact and this is highly sound absorbent. After the plaster has been applied but before it has attained its initial set, a rice brush stipple may be applied to the surface to remove all traces of trowel marks and to produce a sand finish effect. This practice however is optional and is wholly dependent upon the type of finish coat desired.

Instead of fibrous pellets as described, we contemplate the use of blood and albumin in other acoustical plasters such as those employing other porous aggregates, such as slag and/or pumice stone, and when blood and albumin are added to such plasters their working and acoustical qualities are greatly improved. These involve also the use of lime as above indicated.

We claim:

1. The method of making acoustical or insulating plaster, comprising mixing calcined plaster with a relatively high proportion of disintegrated fibrous pellets containing some lime, and with a small proportion of albumin to react with the lime and produce frothing when mixed with water.

2. The method of making acoustical or insulating plaster, comprising mixing distintegrated pellets of mineral wool, and binding agents, and adding albumin and lime to produce foaming and colloidal actions when wet mixed.

3. The method stated in claim 2, the mineral wool being in the proportions 40–60%, the binding agents 40–50% and the albumin and lime less than 1% each.

4. In a method of making an acoustical or insulating wall plaster which upon the addition of water may be applied to walls and ceilings by a plasterer using standard plastering practices, the step of subjecting wads of fibrous material to friction and agitation and thereby reducing the same to a multiplicity of small fibrous masses, thereby increasing their apparent density, preliminary to mixing the same with other ingredients of the plaster.

5. The method of making acoustical or insulating wall plaster which upon the addition of water may be applied to walls and ceilings by a plasterer using standard plastering practices, comprising reducing mineral wool pellets to fine fibrous masses, all of which are less than ⅕″ in diameter, in a quantity exceeding 50% by weight of the total formula, and mixing said fibrous masses with less than 50% by weight of a cementing agent of the non-metallic mineral class, and less than 1% of an albuminous material.

6. The method of making acoustical or insulating wall plaster which may be applied to walls and ceilings by a plasterer using standard plastering practices, comprising mixing pellets of fibrous material and a cementing agent of the non-metallic mineral class and subjecting the same to friction and thereby reducing and disintegrating said pellets to small fibrous masses of less than ⅕" in diameter and increased apparent density and which forms a smooth working mixture when mixed with water.

7. The method of making an acoustical or insulating wall plaster which may be applied to walls and ceilings by a plasterer using standard plastering practices, comprising mixing small fibrous pellets containing some free lime, said pellets having been so distintegrated and compacted that practically 100% or less than ⅕" in diameter, with a cementitious binding material of non-metallic mineral class, and adding a small percentage of albumin to react with the free lime present to produce frothing when mixed with water.

8. A wall plaster composition comprising 40% to 60% of mineral wool pellets reduced and compacted until they are substantially all less than ⅕" in diameter and of increased apparent density, 40% to 50% of a cementitious binder of the non-metallic mineral classification, and .1% to .2% of pulverized albumin.

9. In a method of making acoustical or insulating wall plaster, the steps of subjecting ordinarily relative coarse tufts or wads of mineral wool to a preliminary thorough agitation and friction and thereby reducing the same in size and increasing their apparent density to an extent sufficient to form a mass of relative fine pellets capable of being smoothly worked, and afterwards mixing the same with other ingredients to form a plaster that may be applied to walls and ceilings by a plasterer using standard plastering practices.

THOMAS P. FINEFROCK.
WILLIAM F. O'NEIL.